United States Patent
Hagstrom

[11] Patent Number: 6,022,429
[45] Date of Patent: Feb. 8, 2000

[54] LAMINATION TECHNIQUE

[75] Inventor: Erick Hagstrom, Hamel, Minn.

[73] Assignee: Fargo Electronics, Inc., Eden Prairie, Minn.

[21] Appl. No.: 09/128,316

[22] Filed: Aug. 3, 1998

Related U.S. Application Data

[63] Continuation of application No. 08/851,637, May 6, 1997, Pat. No. 5,807,461.

[60] Provisional application No. 60/017,100, May 9, 1996.

[51] Int. Cl.⁷ ..................................... B32B 31/00
[52] U.S. Cl. ............................ 156/64; 156/238; 156/277
[58] Field of Search ........................... 156/64, 230, 235, 156/238, 177, 350, 361, 384, 387, 540, 541, 542, 555, 583.1

[56] References Cited

U.S. PATENT DOCUMENTS

| | | | |
|---|---|---|---|
| 3,434,902 | 3/1969 | Bliss | 156/230 |
| 4,287,285 | 9/1981 | Mosehauer | 430/124 |
| 4,300,974 | 11/1981 | Bauer | 156/360 |
| 4,617,080 | 10/1986 | Kobayashi et al. | 156/359 |
| 4,687,526 | 8/1987 | Wilfert | 156/64 |
| 5,060,981 | 10/1991 | Fossum et al. | 283/109 |
| 5,172,938 | 12/1992 | Schmidt | 283/109 |
| 5,238,524 | 8/1993 | Seki et al. | 156/538 |
| 5,277,501 | 1/1994 | Tanaka et al. | 400/120 |
| 5,437,960 | 8/1995 | Nagate et al. | 430/256 |
| 5,484,502 | 1/1996 | Bozanic | 156/235 |
| 5,503,702 | 4/1996 | Filicicchia et al. | 156/249 |
| 5,614,058 | 3/1997 | Didelot et al. | 156/542 |
| 5,626,699 | 5/1997 | Didelot et al. | 156/99 |
| 5,673,076 | 9/1997 | Nardone et al. | 347/171 |
| 5,735,994 | 4/1998 | Lappe et al. | 156/386 |
| 5,807,461 | 9/1998 | Hagstrom | 156/361 |

FOREIGN PATENT DOCUMENTS

| | | |
|---|---|---|
| 6-95291 | 4/1994 | Japan . |
| 8-67099 | 3/1996 | Japan . |
| WO 95/09084 | 4/1995 | WIPO . |
| WO 95/10097 | 4/1995 | WIPO . |
| WO 95/18720 | 7/1995 | WIPO . |

*Primary Examiner*—James Sells
*Attorney, Agent, or Firm*—Westman, Champlin & Kelly, P.A.

[57] ABSTRACT

A lamination system includes a supply and a take-up roll carrying a web therebetween. The web carries a laminate. The laminate is applied to a printed card as the card moves between two rollers. At least one roller may be heated and responsively pressed against the printed card to cause adhesion of the laminate to the printed card.

5 Claims, 1 Drawing Sheet

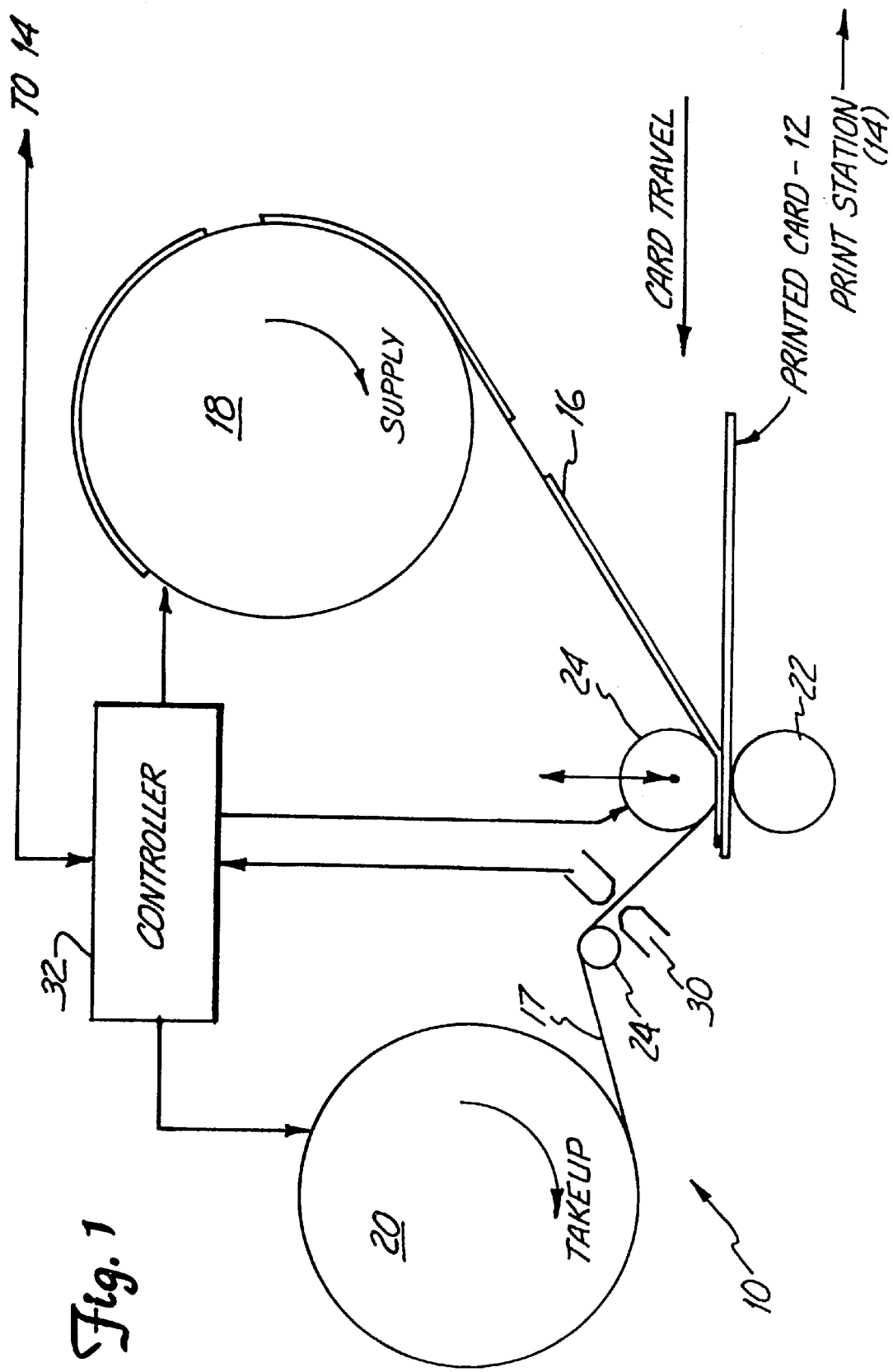

LAMINATION TECHNIQUE

BACKGROUND OF THE INVENTION

This is a Continuation application of U.S. Ser. No. 08/851,637, filed May 6, 1997, U.S. Pat. No. 5,807,461 which claims the benefit of earlier filed U.S. Provisional Application No. 60/017,100, entitled LAMINATION TECHNIQUE filed on May 9, 1996.

The present invention relates to a lamination process. More specifically, the present invention relates to applying a laminate film to a printed card.

Printed materials such as printed cards which are used for photographic identification cards are known. It is often desirable to apply a laminate layer to protect the printed card. The laminate layer to protect the printed card. The laminate layer adds stiffness and protects the printed card from damage. Preferably, the laminate layer is of a clear material such that the printing on the card can be observed therethrough.

There are various types of printing and lamination processes known in the art. Various examples, include:

U.S. Pat. No. 5,484,502, issued Jan. 16, 1996 to Bozanic and is entitled UV-HARD COAT TRANSFER. The Bozanic reference describes a thermal ink transfer printing technique for printing labeling for an instrument gauge. The printing step is shown in FIG. 2. A lamination process shown in FIG. 3 uses a hot press to apply a laminate to the printed gauge.

The Nagate et al. reference U.S. Pat. No. 5,437,960, issued Aug. 1, 1995 and is entitled PROCESS FOR LAMINATING PHOTOSENSITIVE LAYER. Referring to FIGS. 4(A) through 4(F), Nagate shows applying a laminate onto a base sheet using a heater 25. A pair of rollers 7 and 8 are heated and used to attach the laminate to the base sheet. An air cylinder 28 shown in FIG. 4(A) is used to squeeze rollers 7 and 8 together.

The Schmidt et al. reference U.S. Pat. No. 5,172,938, issued Dec. 22, 1992 and is entitled I.D. CARD PRODUCT. The Schmidt reference relates to applying a laminate carried on roll 45 onto an identification card. The laminate is transparent.

U.S. Pat. No. 4,687,526, issued Aug. 18, 1987 to Wilfert and is entitled METHOD OF MAKING AN IDENTIFICATION CARD. Wilfert describes an I.D. type printer which uses a laser printer 22 whose output is fed into a laminator 26. The laminator 26 applies a transparent thermal plastic material.

U.S. Pat. No. 4,617,080, issued Oct. 14, 1986 to Kobayashi et al. and is entitled FILM LAMINATING APPARATUS. The Kobayashi et al. reference relates to laminating paper which carries printing information such as characters or picture images. A laminate is carried on web 3 and is transferred to papers sheet L. A heating element 6 is used along with pressure from roller 7. The device also uses two optical sensors 12 and 15 to detect the presence of the film and the paper end.

U.S. Pat. No. 4,287,285, issued Sep. 1, 1981 to Mosehauer and is entitled METHOD AND APPARATUS FOR FABRICATING PERSONAL IDENTIFICATION DOCUMENTS. The Mosehauer reference uses a photoconductor technique for forming an image on an identification card. A laminate is applied to the card following printing using heated rollers 61 and 62.

SUMMARY OF THE INVENTION

The present invention provides a lamination process for a printed card such as the type used in a identification card printing system.

A printed card is fed between two rollers. At the same time, a laminate material carried on a web is fed between the rollers. At least one of the rollers is heated and may be actuated against the card to press the laminate against a surface of the card. An optical sensor is provided to detect the laminate carried on the web. As the card and laminate are moved between the two rollers, the laminate is pressed against the card and an adhesive, activated by heat and pressure, attaches the laminate to the card.

BRIEF DESCRIPTION OF THE DRAWINGS

FIG. 1 is a simplified diagram showing a lamination process in accordance with the present invention.

DETAILED DESCRIPTION OF THE PREFERRED EMBODIMENTS

FIG. 1 shows lamination system 10 in accordance with the present invention. Lamination system 10 receives printed card 12, such as an identification card, from a print station 14. A laminate 16 is carried on a web 17 between a supply roll 18 and a take-up roll 20. Laminate 16 and printed card 12 are fed through rollers 22 and 24. Web 17 is carried around roller 26. As printed card 12 moves through rollers 22 and 24, roller 24 is moved downward and presses laminate 16 against the printed card 12. Preferably, roller 24 is heated. Adhesive carried on laminate 16 causes laminate 16 to be adhered to printed card 12. An optical sensor 30 is provided to detect movement of web 17. For example, web 17 can carry index markings. Additionally, optical sensor 30 can be used to detect a failure of laminate 16 to adhere to printed card 12. Preferably, laminate 16 is made of a protective material and is transparent to allow viewing therethrough. A controller 32 is operably coupled to rollers 18, 20 and 24 and to optical sensor 30 and print station 14 and is able to control the printing and lamination process.

Although the present invention has been described with reference to preferred embodiments, workers skilled in the art will recognize that changes may be made in form and detail without departing from the spirit and scope of the invention.

What is claimed is:

1. A method for printing and laminating an identification card, comprising:

printing onto the identification card at a print station;

moving the printed identification card through a lamination system along a card travel path;

transferring a web carrying a transparent laminate releasably adhered thereon between a web supply roll and a web takeup roll along a web transfer path, wherein at least a portion of the web transfer path intersects the card travel path;

sensing a mark carried on the web;

detecting movement of the web based upon the step of sensing the mark;

applying pressure to the laminate and the printed card when the laminate and the printed card are aligned between the printed card travel path and the web travel path;

heating the laminate when the laminate and the printed card are aligned between the printed card travel path and the web travel path; and adhering the laminate to the printed identification card through the steps of heating and applying pressure.

2. The method of claim 1 wherein the steps of applying pressure and heating comprise heating and actuating a roller.

3. The method of claim 1 including controlling movement of the printed card based upon the step of detecting movement of the web.

4. The method of claim 1 wherein the step of sensing comprises optically sensing the mark.

5. The method of claim 1 including detecting a failure of the laminate to adhere to the card based upon the step of sensing.

* * * * *